G. A. SUFFA.
PUSH ROD.
APPLICATION FILED JAN. 17, 1916.
1,210,871. Patented Jan. 2, 1917.
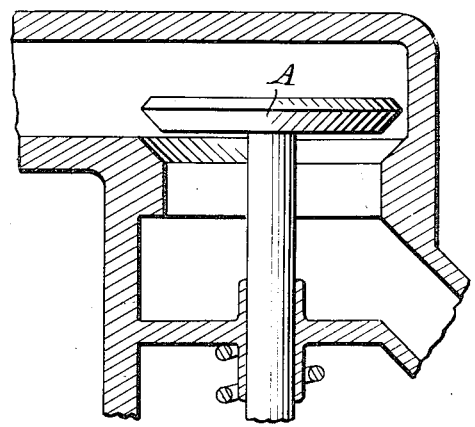
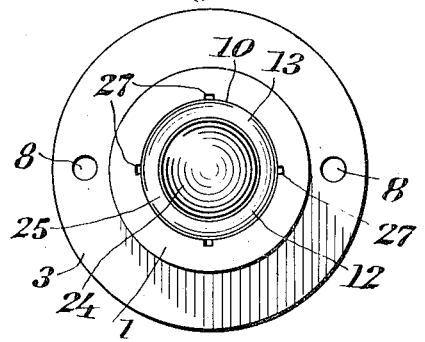
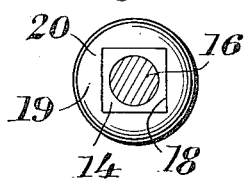
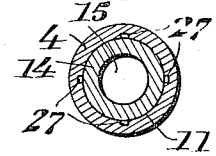
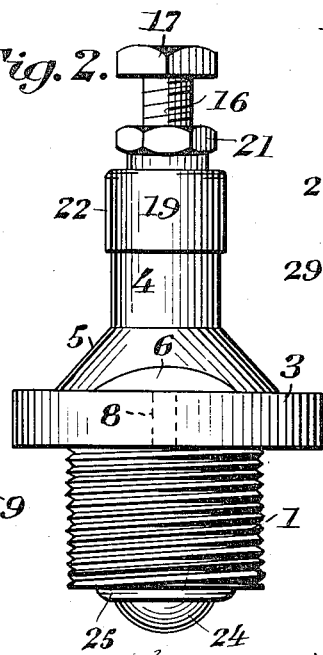
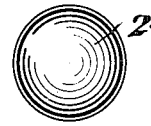
Inventor
George A. Suffa
By
Henry L. Thomson
Attorney

UNITED STATES PATENT OFFICE.

GEORGE A. SUFFA, OF DORCHESTER, MASSACHUSETTS.

PUSH-ROD.

1,210,871.   Specification of Letters Patent.   Patented Jan. 2, 1917.

Application filed January 17, 1916. Serial No. 72,518.

*To all whom it may concern:*

Be it known that I, GEORGE A. SUFFA, a citizen of the United States of America, residing at Dorchester, in the county of Suffolk and State of Massachusetts, have invented new and useful Improvements in Push-Rods, of which the following is a specification.

This invention relates to improvements in push rods for operating valves of internal combustion engines.

The principal object of the invention is to provide a push rod having a spherical surface against which the usual valve operating cam of the engine is adapted to ride, and to construct the device as an entirety having a minimum of wear surfaces, thereby providing for longevity of the same.

Another object of my invention is to provide a push rod mounted in a housing secured to the engine base, the push rod being revoluble within said housing.

A still further object is to provide means for lubricating all of the movable parts of the improved device.

It is also my purpose to provide an improved push rod which is simple in construction, reliable and efficient in its operation and inexpensive to manufacture.

With these and other objects in view my invention consists in the construction and arrangement of parts illustrated in the accompanying drawing and pointed out in the claims appended hereto.

In the drawings: Figure 1, shows in section a portion of an internal combustion engine provided with my improved push rod, the cam being shown in raised position, Fig. 2, is a view in elevation of my device detached and in lowered position, the view being shown at right angles to Fig. 1, Fig. 3, is a bottom plan view, Fig. 4, is a horizontal sectional view, taken on the line 4—4 of Fig. 1, Fig. 5, is a similar view taken on the line 5—5 of Fig. 1, and, Figs. 6 and 7 are detail views of the lower portion of the push rod.

Referring to the drawings wherein like parts are identified by the same reference characters throughout the several views, the valve A has a stem B encircled by an expansible spring C, the lower end of which is in engagement with a collar D formed on the lower end of the valve stem that the valve may be securely held in its seat.

My device consists of a push rod movable within a tubular housing which is interposed between the lower end of the valve stem C and the cam shaft E. The housing comprises a screwthreaded shank 1 for engagement with the screw threads formed in the opening 2 of the engine base F. Above the shank 1 is formed an enlarged portion 3 which engages the engine base, and an upwardly extending portion 4 which is of somewhat less diameter than the diameter of the screwthreaded shank 1. A tapered portion 5 intermediate the portions 3 and 4 is provided with oppositely engaged notches 6 which are designed to be engaged by a wrench for securing the housing to the engine base. Set screws 7 are passed through openings 8 formed in the portion 3 of the housing adjacent the notches 6 for engagement with the threaded openings 9 formed in the engine base.

The casing has formed therein communicating cylindrical passages 10 and 11 in which is adapted to be inserted the push rod 12 composed of an enlarged lower portion 13 for engagement with the passage 10 and a reduced upper portion 14 for engagement with the passage 11. The diameter of the push rod is such that it will snugly slide within the housing, and be free to revolve therein.

The upper portion 14 of the push rod 12 is internally screw-threaded as at 15, for the reception of a threaded shank 16 having a head 17, for engagement with the lower end of the valve stem B. The upper end 18 of the push rod is angular in form, that a cap 19 having an angular opening 20 may be firmly held in position when the lock nut 21, is screwed downwardly thereon. The cap 19, has a side wall 22 which snugly engages the upper end of housing and prevents foreign matter from entering therein. The lower end 13 of the push rod is provided with a spherical recess 23, for the reception of the ball 24 the lower edge 25, being bent inwardly that the ball may be securely held in position.

In the operation of the device the cam 26 formed on the camshaft E is in engagement with the ball 24, and as it revolves exerts an upward movement thereon which raises the push rod, the head 17 thereof engaging the lower end of the valve stem which causes the valve to leave its seat as illustrated in Fig. 1 of the drawing.

The push rod moves within the housing, and revolves during the operation of the engine, therefore, that considerable friction between the push rod and the housing may be eliminated I have provided the grooves 27 in walls of the openings 10 and 11. The grooves 27 extend the entire longitudinal length within the housing thereby thoroughly lubricating the outer surface of the push rod. The passage 28 as shown in Fig. 6 of the drawing is formed in the lower portion of the push rod 12 and extends from the shoulder formed by the junction of the lower portion 13 with the upper portion 14, to the upper edge of the recess 23 communicating with an arcuate groove 29 formed in the wall of said recess. As the push rod moves up and down rapidly during the operation of the engine, the lubricant from the cam-shaft is sucked upwardly through the grooves 27 and 29 and the passage 28 thereby providing an oil film for all the movable surfaces within the casing.

From the foregoing it will be seen that in the utilization of the ball 24 as means for engaging the push rod with the cam I have provided universally wearing surfaces while friction has been reduced to a minimum.

While I have herein shown the preferred embodiment of my invention, it is obvious that various changes may be made in the form and arrangement of the parts without departing from the spirit of the appended claims.

Having thus described my invention, I claim:—

1. A device of the class described comprising a housing, a push rod movable within said housing, said push rod being provided with a universally movable spherical surface, means without the casing for preventing foreign matter from entering between the housing and push rod, means within the housing for lubricating said push rod and means for adjusting the length of said push rod.

2. A device of the class described comprising a housing adapted to be secured to the base of an internal combustion engine, and a push rod movable within said housing, said housing being provided with communicating cylindrical passages of variable diameter, said push rod being of a corresponding diameter to snugly engage said passages within said housing, a ball secured to the lower portion of said push rod for engagement with a cam on the camshaft of said engine, means for excluding foreign matter from said push rod, and means for lubricating said ball within said push rod and said push rod within said housing.

In testimony whereof I affix my signature.

GEORGE A. SUFFA.